US008804050B1

(12) United States Patent
MacLeod (10) Patent No.: US 8,804,050 B1
(45) Date of Patent: Aug. 12, 2014

(54) PEAK TIME POWER SAVING (71) Applicant: Eldon Technology Limited, Keighley (GB)

(72) Inventor: Scott MacLeod, Keighley (GB)

(73) Assignee: Eldon Technology Limited (GB)

( * ) Notice: Subject to any disclaimer, the term of this patent is extended or adjusted under 35 U.S.C. 154(b) by 0 days.

(21) Appl. No.: 14/202,290

(22) Filed: Mar. 10, 2014

Related U.S. Application Data (60) Provisional application No. 61/790,753, filed on Mar. 15, 2013.

(51) Int. Cl.
*H04N 5/63* (2006.01)
(52) U.S. Cl.
USPC .......................................... 348/730; 348/725
(58) Field of Classification Search
CPC .......... H04N 21/4126; H04N 21/6582; H04N 21/4436; H04N 21/4424; H04N 21/4432; H04N 21/654; H04N 5/44; H04N 7/163; H04N 5/63; H04N 5/23241; H04N 9/79; H04N 9/87
USPC ................. 348/730, 705–706, 725, 553–554; 725/39, 58
IPC ........................................................ H04N 5/63
See application file for complete search history.

(56) References Cited

U.S. PATENT DOCUMENTS

| 8,531,611 B2* | 9/2013 | Testin et al. .................... 348/730 |
| 8,659,707 B2* | 2/2014 | Toyoda .......................... 348/730 |
| 2011/0261267 A1* | 10/2011 | Kim et al. ...................... 348/730 |
| 2012/0206649 A1* | 8/2012 | Ho et al. ......................... 348/503 |

* cited by examiner

*Primary Examiner* — Trang U Tran
(74) *Attorney, Agent, or Firm* — Kilpatrick Townsend & Stockton LLP (57) ABSTRACT

Systems, methods, and devices enabling peak time power savings are disclosed. An indication of a peak usage period may be processed, the indication received by a television receiver from a service provider. A power savings mode may be selected from operating modes based at least in part on the indication. Configuration information related to the power savings mode may be processed. The television receiver may be configured according to the configuration information related to the power savings mode at a first time corresponding to the peak usage period. The television receiver may operate in conformity with the power savings mode after the first time. The television receiver may be configured according to a second operating mode at a second time after the first time. The television receiver may operate in conformity with the second operating mode after the second time corresponding to the peak usage period.

20 Claims, 5 Drawing Sheets

PEAK TIME POWER SAVING

CROSS-REFERENCE TO RELATED APPLICATION

This application claims priority to U.S. provisional application 61/790,753, filed Mar. 15, 2013, entitled "PEAK TIME POWER SAVING," the entire disclosure of which is hereby incorporated by reference for all purposes.

BACKGROUND

The present disclosure relates in general to television devices, and, more specifically, but not by way of limitation, to systems and methods for managing television receiver power consumption.

Television viewers have come to expect the ability to customize and manage their television receivers according to their preferences. In general, power consumption of a particular television receiver as it stands alone may not be of primary concern for the customer. However, power consumption may be of concern during peak usage periods, such as during the Super Bowl, when a large portion of the customer base may be using their respective equipment.

There is a need for solutions to address such a problem and related problems.

BRIEF SUMMARY

Certain embodiments of the present disclosure relate in general to television devices, and, more specifically, but not by way of limitation, to systems and methods for managing television receiver power consumption.

In one aspect, a method enabling peak time power savings is disclosed. A television receiver may perform any one or combination of the following. An indication of a peak usage period may be processed. The indication may be received by a television receiver from a service provider via a network. The peak usage period may correspond to television receiver usage of a plurality of television receivers in a media content distribution system. A power savings mode may be selected from a plurality of operating modes based at least in part on the indication received by the television receiver from the service provider. Configuration information related to the power savings mode may be processed. The television receiver may be configured according to the configuration information related to the power savings mode at a first time corresponding to the peak usage period. The television receiver may operate in conformity with the power savings mode after the first time corresponding to the peak usage period. The television receiver may be configured according to a second operating mode of the plurality of operating modes at a second time corresponding to the peak usage period after the first time corresponding to the peak usage period. The television receiver may operate in conformity with the second operating mode after the second time corresponding to the peak usage period.

In another aspect, a television receiver that enables peak time power savings is disclosed. The television receiver may include one or more processors and a memory communicatively coupled with and readable by the one or more processors and having stored therein processor-readable instructions which, when executed by the one or more processors, cause the one or more processors to perform any one or combination of the following. An indication of a peak usage period may be processed. The indication may be received by a television receiver from a service provider via a network. The peak usage period may correspond to television receiver usage of a plurality of television receivers in a media content distribution system. A power savings mode may be selected from a plurality of operating modes based at least in part on the indication received by the television receiver from the service provider. Configuration information related to the power savings mode may be processed. The television receiver may be configured according to the configuration information related to the power savings mode at a first time corresponding to the peak usage period. The television receiver may operate in conformity with the power savings mode after the first time corresponding to the peak usage period. The television receiver may be configured according to a second operating mode of the plurality of operating modes at a second time corresponding to the peak usage period after the first time corresponding to the peak usage period. The television receiver may operate in conformity with the second operating mode after the second time corresponding to the peak usage period.

In yet another aspect, a non-transitory processor-readable medium including processor-readable instructions is disclosed. The processor-readable instructions, when executed by one or more processors, may cause the one or more processors to perform any one or combination of the following. An indication of a peak usage period may be processed. The indication may be received by a television receiver from a service provider via a network. The peak usage period may correspond to television receiver usage of a plurality of television receivers in a media content distribution system. A power savings mode may be selected from a plurality of operating modes based at least in part on the indication received by the television receiver from the service provider. Configuration information related to the power savings mode may be processed. The television receiver may be configured according to the configuration information related to the power savings mode at a first time corresponding to the peak usage period. The television receiver may operate in conformity with the power savings mode after the first time corresponding to the peak usage period. The television receiver may be configured according to a second operating mode of the plurality of operating modes at a second time corresponding to the peak usage period after the first time corresponding to the peak usage period. The television receiver may operate in conformity with the second operating mode after the second time corresponding to the peak usage period.

Certain embodiments may include one or a combination of the following. The first time corresponding to the peak usage period may be prior to the peak usage period. The second time corresponding to the peak usage period may be after the peak usage period. The television receiver may operate in conformity with the second operating mode prior to the first time corresponding to the peak usage period. The indication of the peak usage period may be pushed to the television receiver by the service provider. The indication of the peak usage period may be pulled by the television receiver from the service provider. The first time corresponding to the peak usage period may be determined based at least in part on the indication received by the television receiver from the service provider. The first time corresponding to the peak usage period may be determined based at least in part on the indication received by the television receiver from the service provider and programming information. The first time corresponding to the peak usage period and the second time corresponding to the peak usage period may be determined based at least in part on the indication received by the television receiver from the service provider.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

The present disclosure is directed to systems and methods for managing television receiver power consumption. In general, power consumption of a particular television receiver as it stands alone may not be of primary concern for the customer. However, power consumption may be of concern during peak usage periods, such as during the Super Bowl, when a large portion of the customer base may be using their respective equipment. The concern may stem from the presence of a collective power "wasting," where a large number of television receivers may be using resources that may not necessarily be required to be used during the peak usage period. In accordance with certain embodiments of the present disclosure, a television receiver may enter a power saving or savings configuration or mode whereby the television receiver may identify a peak usage period and reconfigure itself in an attempt to reduce power consumption.

For example, a particular television receiver may disable a network connection during a peak usage period, when the network connection is not necessary or not being used. In another example, a particular television receiver may reschedule a recording if possible during a peak usage period so that it could power down a particular tuner and/or demodulator, and also limit access to its hard disk. In general, a particular television receiver may disable, power down, etc., any particular software and/or hardware resource as desired without necessarily impacting on the user experience. In this manner, a particular television receiver may be configured to intelligently manage its resources during peak usage periods.

The cumulative savings may be substantial when a large portion of the customer base has similarly configured television receiver equipment. For example, if 3 million customers having television receivers configured to intelligently manage resources in accordance with the present disclosure were to disable non-essential resources during the Super Bowl, a substantive power "savings" may be realized. Other embodiments are possible.

In some embodiments, a television receiver configured to intelligently manage resources in accordance with the present disclosure may be informed of a potential upcoming peak usage period, and then television receiver may implement a power savings mode to apply power savings measures during the potential upcoming peak usage period. For example, a service provider may broadcast preferred configuration information to all accessible television receivers so the same may properly configure themselves during the upcoming peak usage period. In another example, the television receiver itself may be configured to periodically or at least intermittently access a server over a network to identify potential upcoming peak usage periods. Other embodiments are possible.

In some embodiments, a television receiver configured to intelligently manage resources in accordance with the present disclosure may be configured to allow a customer or user to select a type of power savings mode or configuration. For example, a user may be enabled to select a "high" power savings configuration, a "medium" power savings configuration, or a "low" power savings configuration for an upcoming peak usage period. In this example, a "high" power savings configuration may specify a greater number of resources that are to be disabled, powered down, etc., when compared to "medium" power savings configuration and the "low" power savings configuration. In this example, the "low" power savings configuration may not be a power savings configuration at all. In this manner, some granularity may be provided in terms of power savings modes or configurations for peak usage periods. Other embodiments are possible.

In some embodiments, a television receiver configured to intelligently manage resources in accordance with the present disclosure may be configured to implement a particular power savings configuration for each one of number television receivers within a home network. For example, a primary television receiver located in a living room may be subject to a first power savings configuration for a particular peak usage period, and a secondary television receiver located in a bedroom may be subject to a second power savings configuration for the particular peak usage period. For example, the secondary television receiver may be substantially powered down during the Super Bowl, whereas all resources of the primary television receiver may be enabled during the Super Bowl. Other embodiments are possible.

In some embodiments, a television receiver configured to intelligently manage resources in accordance with the present disclosure may be configured to surface to a user power savings information. For example, on a monthly-basis a particular television receiver may output a user interface or display that lists power saving for the particular month (e.g., "You conserved 100 Watts in January"). Along with power savings, the particular television receiver may output a user interface or display that lists a dollar amount associated with power savings for the particular month (e.g., "You saved $20 in January").

Figure 1:
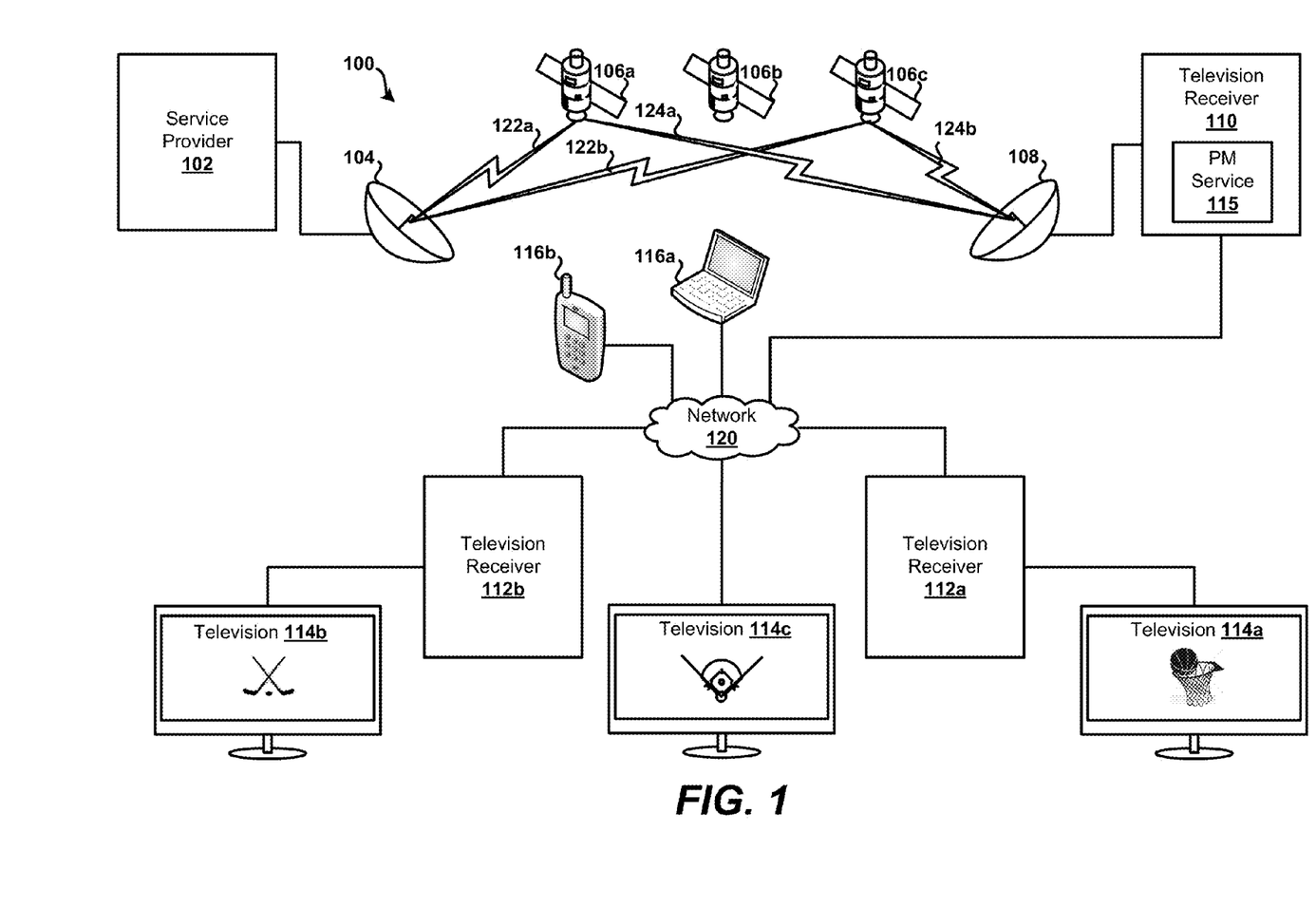
FIG. 1 shows an example media content distribution system in which aspects of the present disclosure may be implemented, in accordance with certain embodiments of the present disclosure.

Referring now to FIG. 1 an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geo-synchronous) satellites 106a-c, a satellite dish 108, a PTR (Primary Television Receiver) 110, a plurality of secondary television receivers 112a-b, a plurality of televisions 114a-c, and a plurality of computing devices 116a-b. In some embodiments, the PTR 110 may include a PM service 115 configured to manage television receiver power consumption in accordance with the present disclosure.

The system 100 may also include at least one network 120 that establishes a bi-directional communication path for data transfer between and among the PTR 110, secondary television receivers 112a-b, televisions 114a-c, and computing devices 116a-b of the example system 100. In some embodiments, the network 120 may further establish a bi-directional communication path (not shown) for data transfer between the PTR 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 100.

The PTR 110, and the secondary television receivers 112a-b, as described throughout may generally be any type of television receiver, such as a STB (Set Top Box) for example. In another example, the PTR 110, and the secondary television receivers 112a-b, may exhibit functionality integrated as part of or into a television, a DVR, a computing device, such as a tablet computing device, or any other computing system or device, as well as variations thereof. Further, the PTR 110 and the network 120, together with the secondary television receivers 112a-b, televisions 114a-c, and computing devices 116a-b, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 106a-c may be configured to receive uplink signals 122a-b from the satellite uplink 104. In this example, the uplink signals 122a-b may contain one or more transponder streams of particular data or content, such as particular television channel, that is supplied by the service provider 102. For example, each of the respective uplink signals 122a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc.

The satellites 106a-c may further be configured to relay the uplink signals 122a-b to the satellite dish 108 as downlink signals 124a-b. Similar to the uplink signals 122a-b, each of the downlink signals 124a-b may contain one or more transponder streams of particular data or content, such as various encoded and/or at least partially electronically scrambled television channels, on-demand programming, etc., in accordance with an allotted carrier frequency and bandwidth. The downlink signals 124a-b, however, may not necessarily contain the same or similar content as a corresponding one of the uplink signals 122a-b. For example, the uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122a-b and the downlink signals 124a-b, both in terms of content and underlying characteristics.

Continuing with the example implementation scenario, the satellite dish 108 may be provided for use to receive television channels, such as on a subscription basis, provided by the service provider 102, satellite uplink 104, and/or satellites 106a-c. For example, the satellite dish 108 may be configured to receive particular transponder streams, or downlink signals 124a-b, from one or more of the satellites 106a-c. Based on the characteristics of the PTR 110 and/or satellite dish 108, however, it may only be possible to capture transponder streams from a limited number of transponders concurrently. For example, a tuner of the PTR 110 may only be able to tune to a single transponder stream from a transponder of a single satellite, such as satellite 106a, at a time.

Additionally, the PTR 110, which is communicatively coupled to the satellite dish 108, may subsequently select via tuner (see e.g., FIG. 3), decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented "live," or from a recording as previously stored on, by, or at the PTR 110. In this example, the HD channel may be output to the television 114c in accordance with the HDMI/HDCP content protection technologies. Other embodiments are possible. For example, in some embodiments, the HD channel may be output to the television 114c in accordance with the MoCA® (Multimedia over Coax Alliance) home entertainment networking standard. Still other embodiments are possible.

Further, the PTR 110 may select via tuner, decode, and relay particular transponder streams to one or both of the secondary television receivers 112a-b, which may in turn relay particular transponder streams to a corresponding one of the television 114a and the television 114a for display thereon. For example, the satellite dish 108 and the PTR 110 may, respectively, be configured to receive, decode, and relay at least one television channel to the television 114a by way of the secondary television receiver 112a. Similar to the above example, the television channel may generally be presented "live," or from a recording as previously stored on the PTR 110, and may be output to the television 114a by way of the secondary television receiver 112a in accordance with a particular content protection technology and/or networking standard. Other embodiments are possible.

Still further, the satellite dish 108 and the PTR 110 may, respectively, be configured to receive, decode, and relay at least one premium television channel to one or both of the computing devices 116a-b. Similar to the above-examples, the television channel may generally be presented "live," or from a recording as previously stored on the PTR 110, and may be output to one or both of the computing devices 116a-b in accordance with a particular content protection technology and/or networking standard. Other embodiments are possible.

Figure 2:
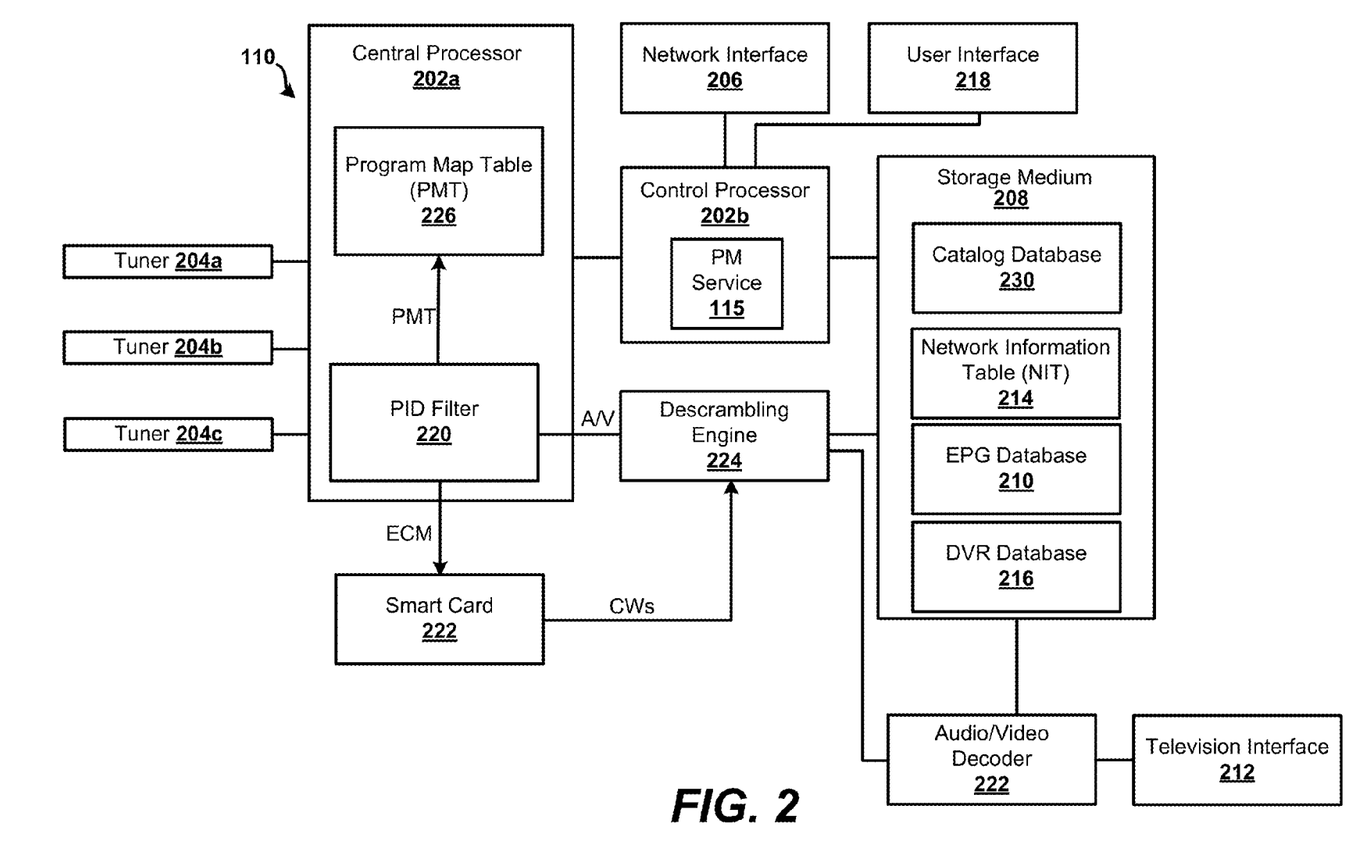
FIG. 2 shows a simplified block diagram of a television receiver of FIG. 1, in accordance with certain embodiments of the present disclosure.

Referring now to FIG. 2, a simplified block diagram of the PTR 110 of FIG. 1 is shown in accordance with the present disclosure. In some embodiments, at least one of the secondary television receivers 112a-b may be configured in a manner similar to that of the PTR 110. In other embodiments, at least one of the secondary television receivers 112a-b may be configured to exhibit a reduced functionality as compared to the PTR 110, and may depend at least to a certain degree on the PTR 110 to implement certain features or functionality. In this example, at least one of the secondary television receivers 112a-b may be referred to as a "thin client."

For brevity, the PTR 110 is depicted in a simplified and conceptual form, and may generally include more or fewer elements or components as desired in accordance with the present disclosure. Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the PTR 110 may be configured to include any number of other various components or logical modules that are implemented in hardware, software, firmware, or any combination thereof, and such components or logical modules may or may not be implementation-specific.

In some embodiments, the PTR 110 and/or the secondary television receivers 112a-b comprise of a STB. In addition to being in the form of an STB, at least the PTR 110 may be incorporated into another device, such as the television 114c. For example, the television 114c may have an integrated television receiver that does not involve an external STB being coupled with the television 114c. A STB may contain some or all of the components of the PTR 110 and/or may be able to perform some or all of the functions of the PTR 110. Accordingly, instances in this document referring to a STB, and steps being performed by a STB, may also be performed, more generally, by the PTR 110 and/or secondary television receivers 112a-b.

Referring still to FIG. 2, the PTR 110 may include the PM service 115 configured to manage television receiver power consumption in accordance with the present disclosure, at least one processor 202, including a central processor 202a and a control processor 202b, a plurality of tuners 204a-c, at least one network interface 206, at least one non-transitory computer-readable storage medium 208, at least one EPG database 210, at least one television interface 212, at least one NIT (Networking Information Table) 214, at least one DVR database 216, at least one user interface 218, at least one PID filter 220, at least one smart card 222, at least one descrambling engine 224, at least one PMT (Program Map Table) 226, at least one decoder 228, and a catalogue database 230. In other embodiments of the PTR 110, fewer or greater numbers of components may be present. Further, functionality of one or more components may be combined; for example, functions of the descrambling engine 224 may be performed by the central processor 202a. Still further, functionality of components may be spread among additional components. For example, the PID filter 220 may be handled by hardware and/or software separate from the PMT 226.

The processor 202 may include one or more specialized and/or general-purpose processors configured to perform processes such as tuning to a particular channel, accessing and displaying EPG information from the EPG database 210, and/or receiving and processing input from a user. For example, processor 202 may include one or more processors dedicated to decoding video signals from a particular format, such as MPEG (Moving Picture Experts Group), for output and display on a television and for performing decryption.

The control processor 202b may communicate with the central processor 202a. The control processor 202b may control the recording of television channels based on timers stored in the DVR database 216. The control processor 202b may initiate recording of a television channel by sending a record command along with an indication of the television channel to be recorded to the central processor 202a. The control processor 202b may not send a second record command, when additional recording is to begin at the same time, until an acknowledgement that recording of the first television channel has successfully been received and initiated by the central processor 202a. The control processor 202b may also provide commands to the central processor 202a when recording of a television channel is to cease. In addition to providing commands relating to the recording of television channels, the control processor 202b may provide commands to the central processor 202a that indicate television channels to be output to the decoder 228 for output to a presentation device, such as the television 114c for example.

The control processor 202b may also communicate with the network interface 206 and the user interface 218. The control processor 202b may handle in-coming data from the network interface 206 and the user interface 218. Additionally, the control processor 202b may be configured to output data via the network interface 206.

The tuners 204a-c may be used to tune to television channels, such as television channels transmitted via satellite or cable, such as satellites 106a-c. Each respective one of the tuner 204a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. Still another tuner (e.g., tuner 204c) may be used to check various television channels to determine if they are available or not. If multiple television channels transmitted on the same transponder stream are desired, a particular tuner (e.g., tuner 204a) may be used to receive the signal containing the multiple television channels for presentation and/or recording. The tuners 204a-c may receive commands from the central processor 202a. Such commands may instruct the tuners 204a-c which frequencies are to be used for tuning.

The network interface 206 may be used to communicate via an alternate communication channel with a television service provider. For example, the primary communication channel may be via satellite, which may be unidirectional to the STB, and the alternate communication channel, which may be bi-directional, may be via a network, such as the Internet. The PTR 110 may be able to communicate with the service provider 102 of FIG. 1 via a network, such as the Internet. This communication may be bidirectional. For example, data may be transmitted from the PTR 110 to the service provider 102, and from the service provider 102 to the PTR 110. The network interface 206 may be configured to communicate via one or more networks, such as the Internet, to communicate with the service provider 102. Information may be transmitted and/or received via the network interface 206.

The storage medium 208 may represent a non-transitory computer-readable storage medium. The storage medium 208 may include memory and/or a hard drive. The storage medium 208 may be used to store information received from one or more satellites and/or information received via the network interface 206. The storage medium 208 may store information related to the EPG database 210, the NIT 214, and/or the DVR database 216. Recorded television programs may be stored using the storage medium 208. The storage medium 208 may be partitioned or otherwise divided such that predefined amounts of the storage medium 208 are devoted to storage of omnibus channel files and user-selected television programs.

The EPG database 210 may store information related to television channels and the timing of programs appearing on such television channels. The EPG database 210 may be stored using the storage medium 208, which may be a hard drive. Information from the EPG database 210 may be used to inform users of what television channels or programs are popular and/or provide recommendations to the user. Information from the EPG database 210 may provide the user with a visual interface (e.g., EPG 202) displayed by a television that allows a user to browse and select television channels and/or television programs for viewing and/or recording. Information used to populate the EPG database 210 may be received via the network interface 206 and/or via satellites, such as satellites 106a-c of FIG. 1 via the tuners 204a-c. For instance, updates to the EPG database 210 may be received periodically via satellite. The EPG database 210 may serve as an interface for a user to control DVR functions of the PTR 110, and/or to enable viewing and/or recording of multiple television channels simultaneously.

In addition to being used to provide users with information about scheduled programming, information from the EPG database 210 may be used to determine when television programs begin and end for the purposes of recording. For instance, when a channel-specific file is recorded that contains multiple television channels, the start and end of time of specific television programs within the channel-specific file may be based on the start and end times indicated in the EPG database 210. Other data may be stored within the EPG database 210 that may be useful in managing channel-specific files, such as series identifiers and episode identifiers, which may be used by a television service provider to identify particular television programs.

The decoder 228 may serve to convert encoded video and audio into a format suitable for output to a display device. For instance, the decoder 228 may receive MPEG video and audio from the storage medium 208, or the descrambling engine 224, to be output to a television. MPEG video and audio from the storage medium 124 may have been recorded to the DVR database 216 as part of a previously-recorded television program. The decoder 228 may convert the MPEG video and audio into a format appropriate to be displayed by a television or other form of display device and audio into a format appropriate to be output from speakers, respectively.

The television interface 212 may serve to output a signal to a television, or another form of display device, in a proper format for display of video and playback of audio. As such, the television interface 212 may output one or more television channels, stored television programming from the storage medium 208, such as television programs from the DVR database 216 and/or information from the EPG database 210 for example, to a television for presentation.

The NIT 214 may store information used by the PTR 110 to access various television channels. The NIT 214 may be stored using the storage medium 208. Information used to populate the NIT 214 may be received via satellite, or cable, via the tuners 204a-c and/or may be received via the network interface 206 from a service provider. As such, information present in the NIT 214 may be periodically updated. The NIT 214 may be locally stored by the PTR 110 using the storage medium 208. Information that may be present in the NIT 214 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 214 may be divided into additional tables. For example, rather than the specific audio PIDs and video PIDs being present in the NIT 214, a channel identifier may be present within NIT 214 which may be used to look up the audio PIDs and video PIDs in another table, such as the PMT 226. For example, the PMT 226 may store information on audio PIDs and video PIDs for television channels that are transmitted on a transponder frequency.

Table 1 below provides a simplified example of the NIT 214 for several television channels. It should be understood that in other embodiments, many more television channels may be represented in the NIT 214. The NIT 214 may be at least periodically updated by a television service provider. As such, television channels may be reassigned to different satellites and/or transponders, and the PTR 110 may be able to handle this reassignment as long as the NIT 214 is updated.

TABLE 1

| Channel | Satellite | Transponder | ECM PID | PMT PID |
|---|---|---|---|---|
| 4 | 1 | 2 | 27 | 1001 |
| 5 | 2 | 11 | 29 | 1002 |
| 7 | 2 | 3 | 31 | 1001 |
| 13 | 2 | 4 | 33 | 1004 |

Based on information in the NIT 214, it may be possible to determine the proper satellite and transponder to which to tune for a particular television channel. In some embodiments, the NIT 214 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 214. Additional information on how the NIT 214, as indicated in Table 1, may be used is provided in reference to FIG. 3. The same PID may be reused on different transponders.

A DVR may permit a television channel to be recorded for a period of time. DVR functionality of the PTR 110 may be managed by the control processor 202*b*. The control processor 202*b* may coordinate the television channel, start time, and stop time of when recording of a television channel is to occur. The DVR database 216 may store information related to the recording of television stations. The DVR database 216 may store timers that are used by the control processor 202*b* to determine when a television channel should be tuned to and its programs recorded to the DVR database 216. However, other embodiments are possible. For example, in some embodiments, the storage medium 208 may store timers. Timer files may be defined as a daily_schedule_db.dat file and a gloal_timer_db.dat file. In general, when a "new" timer is created, a "new" entry may be added into the daily_schedule_db.dat and global_timer_db.dat files, which may include all timer related information such as channel number, start time, duration, etc. Further, a limited amount of the storage medium 208 may be devoted to the DVR database 216. Timers may be set by a service provider and/or one or more users of the PTR 110.

DVR functionality of the control processor 202*b* may have multiple modes. For example, DVR functionality of the control processor 202*b* may be configured to record individual television programs selected by a user to the DVR database 216. Using the EPG database 210, a user may select a particular television program. Based on the date, time period, and television channel indicated by the EPG database 210, the control processor 202*b* may record the associated television program to the DVR database 216. In another example, the DVR database 216 may be used to store recordings of predefined periods of time on one or more television channels. These predefined periods of time may include one or more television programs. For example, Primetime on a particular television network may be recorded each weekday night. Further, multiple television channels may be recorded for such predefined periods of time. Such recording of television channels for predefined periods of time may be defined by a television service provider (e.g., service provider 102).

As an example of this second mode of DVR functionality, a television service provider may configure the PTR 110 to record television programming on multiple, predefined television channels for a predefined period of time, on predefined dates. For instance, a television service provider may configure the PTR 110 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

Whether recording is performed based on a user-selected television program or selection by a television service provider, selection may result in storage by DVR database 216 being managed differently. Separate storage arrangements, such as separate partitions on the same storage device, may be allocated based on which entity designated the television program/channel for recording. As such, the DVR database 216 may use multiple storage arrangements, such as multiple partitions on the storage medium 225. Television programming recorded based on a television service provider selection may be stored on a first storage arrangement. Television programming recorded based on user selection may be stored on a second storage arrangement. Television programming on the first storage arrangement may automatically be deleted after a predefined period of time, such as two weeks. If a television program stored by the first storage arrangement is selected by a user (such as via a displayed EPG) to be saved, the television program may be transferred from the first storage arrangement to the second storage arrangement, such as when the television programming would otherwise be deleted from the first storage arrangement. Additional detail regarding the recording, storage, and maintenance of television programming by the PTR 110 is provided below in conjunction with the figures.

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the control processor 202*b*.

Referring back to tuners 204*a-c*, television channels received via satellite, or cable, may contain at least some scrambled data. Packets of audio and video may be scrambled to prevent unauthorized users, such as nonsubscribers, from receiving television programming without paying the television service provider. When one of the tuners 204*a-c* is receiving data from a particular transponder of a satellite, the transponder stream may be a series of data packets corresponding to multiple television channels. Each data packet may contain a PID, which, in combination with the NIT 214 and/or the PMT 226, can be determined to be associated with particular television channel. Particular data packets, referred to as ECMs may be periodically transmitted. ECMs may be associated with another PID and may be encrypted; the PTR 110 may use the smart card 222 to decrypt ECMs. Decryption of an ECM may only be possible when the user (e.g., PTR 110) has authorization to access the particular television channel associated with the ECM. When an ECM is determined to correspond to a television channel being stored and/or displayed, the ECM may be provided to the smart card 222 for decryption.

When the smart card 222 receives an encrypted ECM, the smart card 222 may decrypt the ECM to obtain some number of control words. In some embodiments, from each ECM received by the smart card 222, two control words are obtained. In some embodiments, when the smart card 222 receives an ECM, it compares the ECM to the previously received ECM. When the two ECMs match, the second ECM is not decrypted because the same control words would be obtained. In other embodiments, each ECM received by the smart card 222 is decrypted; however, when a second ECM matches a first ECM, the outputted control words will match; thus, effectively, the second ECM does not affect the control words output by the smart card 222. The smart card 222 may be permanently part of the PTR 110 or may be configured to be inserted and removed from PTR 110.

The central processor 202*a* may be in communication with the tuners 204*a-c* and the control processor 202*b*. The central processor 202*a* may be configured to receive commands from the control processor 202b. Such commands may indicate when to start/stop recording a television channel and/or when to start/stop causing a television channel to be output to a television. The central processor 202a may control the tuners 204a-c. The central processor 202a may provide commands to the tuners 204a-c that instruct the tuners which satellite, transponder, and/or frequency to tune to. From the tuners 204a-c, the central processor 202a may receive transponder streams of packetized data. As previously detailed, some or all of these packets may include a PID that identifies the content of the packet.

The central processor 202a may be configured to create at least one PID filter 220 that sorts packets received from the tuners 204a-c based on the PIDs. When a tuner is initially tuned to a particular frequency, such as a particular transponder of a satellite, a PID filter may be created based on a PID of PMT data. The PID of PMT data packets may be known because it is stored as part of the NIT 214. From the PMT data packets, the PMT 226 may be constructed by central processor 202a. Table 2 below provides an exemplary snapshot of a PMT. The PMT 226 may be specific to a particular transponder. As such, when tuning to a different transponder occurs, a new PMT may be created for the different transponder.

TABLE 2

| Channel | Video PID | 1$^{st}$ Audio PID | 2$^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in the PMT 226, the audio and video PIDs for specific television channels may be identified. A television channel may have multiple audio PIDs due to a second audio program, which may be in a different language. It should be understood that the values provided in Table 2 are for example purposes only. Actual values may vary. Additional information or less information may also be stored in the PMT 226.

The PID filter 220 may be configured to filter data packets based on PIDs. In some embodiments, the PID filter 220 is created and executed by central processor 202a. In other embodiments, separate hardware may be used to create and execute multiple PID filters. Depending on a television channel selected for recording/viewing, a PID filter may be created to filter the video and audio packets associated with the television channel, based on the PID assignments present in the PMT 226. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 224 or the smart card 222; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 214, may be appropriately routed by the PID filter 220. At a given time, one or multiple PID filters may be executed by the central processor 202a.

The descrambling engine 224 may use the control words output by the smart card 222 in order to descramble video and/or audio corresponding to television channels for storage and/or presentation. Video and/or audio data contained in the transponder data stream received by the tuners 204a-c may be scrambled. Video and/or audio data may be descrambled by descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage in the DVR database 216 and/or to the decoder 228 for output to a television or other presentation equipment via the television interface 212.

The catalog database 230 may be used by the PTR 110 to store information about television programs that are stored as part of a channel-specific file and in individual television program files. The catalog database 230 may be updated as television programs are recorded, transferred, and as files corresponding to television programming are deleted. Data stored in catalog database 270 may be used to locate television programs within a channel-specific file and a program-specific file.

For simplicity, the PTR 110 of FIG. 2 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Figure 3:
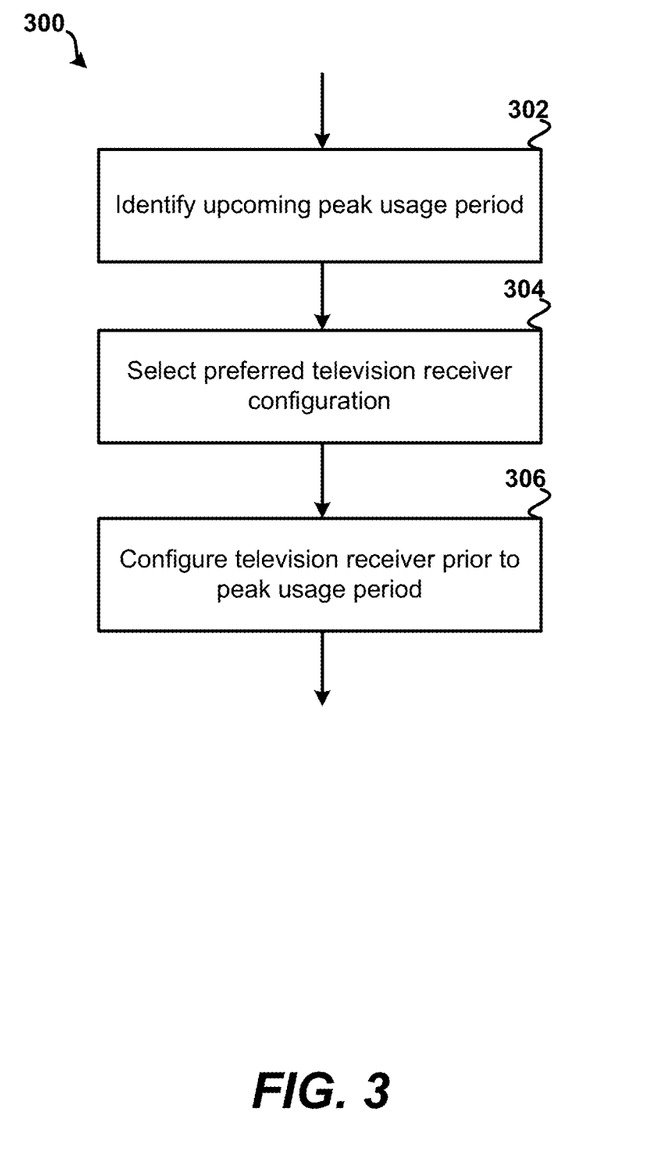
FIG. 3 shows an example method for enabling peak time power savings, in accordance with certain embodiments of the present disclosure.

Referring now to FIG. 3, an example method 300 for enabling peak time power savings is shown in accordance with certain embodiments of the present disclosure. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

In general, steps or modules of the method 300 as described may ultimately be implemented by or on the PTR 110 of FIG. 1. For example, the PM service 115 of or on the PTR 110 may be configured to implement one or more steps, modules, etc., of the example method 300. Other embodiments are however possible. For example, one or more modules or steps of the method 300 may be implemented by or on one or more of the other respective devices or components within the system 100 as described above in connection with FIG. 1. Still other embodiments are possible.

The method may include identifying (module 302), by a television receiver, a potential upcoming peak usage period. In this example, the term "peak usage period" may refer to a period of time where a certain percentage of the customer base is expected to tune to particular programming at a particular time of a particular day. The term "certain percentage" may refer to or be correlated with a greater than "normal" number of customers tuning in to particular programming. This may correspond to a predetermined threshold value. For example, in a "normal" scenario it may be expected that about 5% of the total customer base is expected to watch first particular programming, such as a popular sitcom. In a greater than "normal" scenario it may be expected that about 30% of the total customer base is expected to watch second particular programming, such as the Super Bowl. In this example, a threshold of 20% (which is only used for purposes of example here) may be defined to qualify a time period associated with the second particular programming as a potential upcoming peak usage period. Other embodiments are possible.

The method may include selecting (module 304), by the television receiver, a preferred power savings mode or configuration for the television receiver in light of the potential upcoming peak usage period. For example, the television receiver may select a "high" power savings configuration, a "medium" power savings configuration, or a "low" power savings configuration, to enter into or reconfigure itself for the potential upcoming peak usage period. In one embodiment, the preferred power savings mode or configuration for the television receiver may be predetermined or identified by a particular customer. In another embodiment, the preferred power savings mode or configuration for the television receiver may be a "default" configuration predetermined by a service provider. Other embodiments are possible.

The method may include configuring (module 306), by the television receiver, the television receiver according to the selected preferred power savings mode or configuration prior to the potential upcoming peak usage period. For example, the television receiver may reconfigure itself in accordance with selected preferred power savings mode or configuration 60 seconds prior to the potential upcoming peak usage period. Other embodiments are possible.

Further, the reconfiguration time may be selected as desired. For example, the television receiver may reconfigure itself in accordance with selected preferred power savings mode or configuration 2 minutes, 3 minutes, 5 minutes, 10 minutes, etc., prior to the potential upcoming peak usage period. Still other embodiments are possible.

As mentioned above, power consumption may be of concern during peak usage periods, such as during the Super Bowl, which corresponds to a "major" sporting event. It is contemplated that many different types of broadcast programming may be arbitrarily described or otherwise defined as a "major" event. For example, there may be an occasion where people tune in to see a major news event. They may all tune to the same channel or they may tune to different news channels. Further, the major news event may be known in advance, so the receivers would be able to preconfigure for the event. But, the news event could be some unexpected event like a natural disaster or other incident. This may mean that receivers would not be preconfigured but would receive the command to configure the power saving mode at some point after the commencement of the news event.

Figure 4:
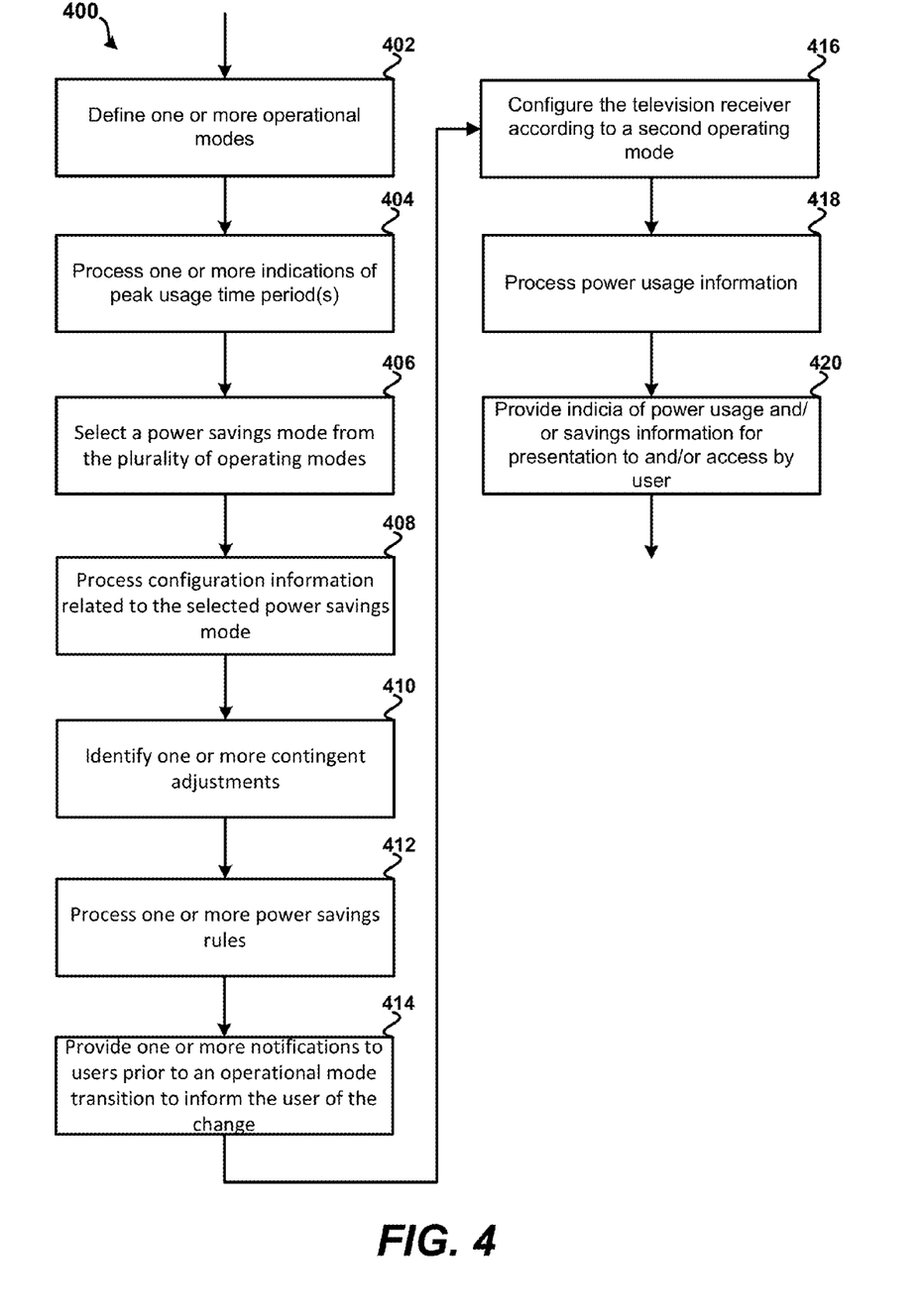
FIG. 4 shows an example method for enabling peak time power savings, in accordance with certain embodiments of the present disclosure.

FIG. 4 shows an example method 400 for enabling peak time power savings, in accordance with certain embodiments of the present disclosure. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

As indicated by block 402, in some embodiments, one or more operational modes may be defined. The one or more operational modes may include any suitable number of power saving modes. The end user could have the option to define and/or select one or more operational modes at the television receiver in some embodiments. In some embodiments, the television receiver may be preset by, say a manufacturer and/or service provider, with the one or more operational modes.

In some embodiments, the television receiver may be configured to automatically define one or more operational modes based at least in part on ejecting the particular set up in which the television receiver is implemented. For example, the television receiver may be configured to automatically identify a list of functions and/or resources, which may include sub-functions, that may be optional to the operation of the television receiver setup, and to automatically rank the list of functions and/or resources according to a precedence order in which the functions may be disabled to increase power savings. In some embodiments, the television receiver may inspect a set of functions against a predetermined checklist, assess the power consumption and/or performance criticality of each function/resource, and inventory each function. In some embodiments, the assessing of the power consumption and/or performance locality may include performing self-tests wherein each functions tested to inform the assessment. In some instances, the ranking may be primarily based upon power savings as being the chief objective, and, accordingly, the precedence order may be determined by the power savings obtainable through disabling particular functions and sub-functions. In some instances, the ranking may be primarily based upon maintaining optimal performance as being the chief objective, and, accordingly, the precedence order may be determined by the extent to which particular functions and sub-functions affect performance and capabilities of the television receiver system. Some embodiments may allow the end user to have the option to select which power scheme is to be employed—one where power savings is the chief objective or one where preserving optimal performance while saving power is the chief objective.

In some implementations, multiple operational modes may be defined to allow for multiple power savings modes. For example, an end user could desire to have power savings apart from peak time power savings. In various embodiments, a power savings configuration could be based on one or more of time of day, day of week, season (e.g., summer), location, temperature, and/or any other suitable basis. For example, a power savings configuration could designate a certain time period in the day for a power savings mode. This could correspond to prime time viewing hours according to typical television viewing trends. It could correspond to relatively hot time periods of the day for locations and seasons where the heat of the day requires high levels of air conditioning and, thus, power consumption. A power savings configuration could designate a temperature threshold such that the savings mode would be initiated when an outside temperature in the location meets or exceeds the temperature threshold. In some embodiments, a service provider or other data source may push indications of local outside temperature to television receivers. Alternatively or additionally, television receivers may pull indications of local outside temperature from a service provider or other data source.

Some implementations could come to the end user preprogrammed to allow user selection of such options. In some cases, the user-selectable options may allow a user to modify criteria for power savings modes. For example, there may be provided a user-selectable option to adjust a temperature threshold such that the savings mode would be initiated when an outside temperature in the location meets or exceeds the temperature threshold.

As indicated by block 404, a television receiver may process an indication of a peak usage period. The peak usage period may correspond to television receiver usage of a plurality of television receivers in a media content distribution system. The indication may be received by the television receiver from a service provider via a network. In some embodiments, a service provider or other data source may push indications of peak usage to television receivers. Alternatively or additionally, television receivers may pull indications of peak usage from a service provider or other data source.

In some embodiments, the indication may be generated based on real-time detection of the peak usage period, and the indication may be pushed to the television receiver by the service provider, for example. This could happen in situations that are unforeseen, where the service provider monitors customer base usage and detects customer usage above one or more thresholds. Such just-in-time detection could be employed in breaking news events of a large scale, such as natural disasters. In some cases, such just-in-time approaches could be employed even though peak times are foreseen, but where the extent of the peak time usage is uncertain. Thus, a service provider may be afforded a wait-and-see approach, so that the service provider may not be forced to preemptively degrade customer television receiver performance in uncertain circumstances.

In some embodiments, the indication may be generated and conveyed in advance of a peak usage period. For example, a service provider may consider historical information for certain television events and determine peak usage time periods for upcoming events in view of the past events. Accordingly, the service provider could convey indications of such to the television receiver in advance. The service provider could convey indications on a periodic basis. Batches of indicia, which could include updates to previously sent information, could be sent at any suitable time.

In some embodiments, the indicia could indicate any one or combination of time information, channel information, program identification, and/or the like. The time information could include start time, stop time, and/or duration. In some embodiments, the television receiver is not apprised of peak usage time period information beyond time information. In some embodiments, the television receiver may be provided with the start time, but not the stop time, and the stop time may be determined based on other information. In some embodiments, the television receiver may be provided with program information and/or channel information, and the television receiver may determine time information corresponding to the peak usage based at least in part on the program information and/or channel information.

In some embodiments, a television receiver may not identify a period of time corresponding to peak usage, but may identify a first time that corresponds to the beginning of a peak usage. For example, the television receiver may receive an indication of a first time from a service provider, the first time corresponding to when the peak usage period begins, and the service provider may not simultaneously provide an indication of the extent of the peak usage period and/or an end time of the peak usage period. The television receiver could, for example, await and/or pull a subsequent indication of the stop time. In some embodiments, a service provider may later provide an indication of the extent of the peak usage period and/or an end time of the peak usage period to the television receiver. Thus, the television receiver, after having received the first time indication, may await further indication from the service provider. Accordingly, in some embodiments, the service provider may provide real-time adjustments based on usage data in order to actively manage television receiver power consumption for a plurality of television receivers.

A service provider may indicate the peak usage period by providing indication of a particular television event to a television receiver. The television receiver could determine the corresponding time period based on the indication of the particular television event. Such a determination could be made by the television receiver accessing EPG information in some embodiments. The television receiver could correlate the indication of the particular television event to time information included in the EPG information. In a specific example, the service provider may indicate a peak usage corresponding to the Super Bowl without indicating time information, and the television receiver could determine the time information corresponding to the Super Bowl based on EPG information.

In some embodiments, a television receiver may receive an indication of a peak usage period from a service provider that indicates the extent of the peak usage period and/or an end time of the peak usage period, and the service provider may later provide an update and/or override. For example, a service provider may identify a particular television event as having the potential for causing a peak usage period and may provide a television receiver with indication of the peak usage period so that the television receiver may be configured accordingly. In some embodiments, a service provider may indicate one or more potential peak usage periods in advance. A service provider could, for example, provides such indications to television receivers on a periodic basis (e.g., once a day, week, month, etc.). However, say the service provider monitors the usage during the television event and determines that the actual usage is less than was anticipated such that television receiver power minimization is not actually necessary; the service provider may indicate to the television receivers, during the television event, an update and/or override so that the television receivers may return to normal operation modes. In such manner, unnecessary minimization modes may be avoided, and service providers may be afforded the opportunity to correct course when anticipated peak usage times do not occur as expected.

As indicated by block 406, the television receiver may select a power savings mode from the plurality of operating modes. The television receiver may select a power savings mode based at least in part on the indication received by the television receiver from the service provider, according to some embodiments. With some embodiments, the television receiver may select a power savings mode based at least in part on other indicia, such as temperature information, time information, etc.

In some cases, there may be only one power savings mode for a particular television receiver, and, thus, the only operating mode options may be a default or normal operating mode and the one power savings mode. In other embodiments, there may be multiple powers saving modes. The multiple powers saving modes could include any combination of user-defined power savings mode(s), preset power saving mode(s), static power savings mode(s), dynamic power savings mode(s), and/or the like. A static power savings mode could correspond to predetermined configuration that disables a certain set of one or more functions. Thus, implementing a static power savings mode may have the same result in every instance for a particular television receiver setup.

A dynamic power savings mode could corresponding to a dynamically adjustable configuration that disables one or more functions, monitors the resulting effects of disablement, compares the results to a power savings threshold, and reconfigures continent on whether the power savings threshold is met. In some embodiments, the power savings threshold could be based at least in part on the indication received from the service provider. For example, the service provider could indicate a need for a high, medium, or low power savings— any other suitable categorization of powers savings. The service provider could indicate a need for power savings with a gradated scale (say, high, medium, low, and/or the like), and the television receiver could correlate the indicated need to a particular power savings mode. As another example, the service provider could indicate a power savings goal for the television receiver. The power savings goal could correspond to an absolute metric such a particular power consumption value or percentage, and the television receiver could correlate the indicate need to a particular power savings mode and/or dynamically adjust to meet the power savings goal. Having a power savings goal, the television receiver could heuristically and/or incrementally adjust function configurations and/or power savings modes until the goal is met. An end user could likewise set a power savings goal for the television receiver to achieve in some embodiments.

As indicated by block 408, the television receiver may process configuration information related to the selected power savings mode. The configuration information could include information about a set of functions for the system, a set of one or more functions to disable according to the power savings mode, a set of one or more other adjustments to make according to the power savings mode, instructions, parameters, and/or rules regarding the same, and/or the like. By way of example, the configuration information could include information about special features that can be disabled. The special features could include the preprocessing of additional content beyond that which is being presented, say additional tuner(s) tuning to additional channels and the preprocessing of additional channel content to anticipate and accelerate channel changes. The special features could include recording features, such as a default recording of prime time content that was not specifically selected by the user, and, hence, the recording device(s) and/or tuners may be disabled. As another example, the configuration information could include information about secondary television receivers in a home network and disabling/powering down one or more functions relating thereto. With some modes, one or more secondary receivers may simply be powered down. Thus, a primary television receiver located in a living room may be subject to a first power savings configuration for a particular peak usage period, and a secondary television receiver located in a bedroom may be subject to a second power savings configuration for the particular peak usage period. The disabling/powering down could be contingent on usage of the secondary television receivers such usage may not be disrupted.

As indicated by block 410, in some embodiments, one or more contingent adjustments may be identified. A contingent adjustment may be a potential adjustment to the television receiver whether the application of the adjustment is contingent on one or more conditions. As indicated by block 412, one or more power savings rules may be processed. The power savings rules may pertain to the contingent adjustment (s) and govern the one or more conditions bearing on the contingent adjustment(s).

As one example, the television receiver may identify a contingent adjustment that can be made without disruption of recording if a program is being recorded by the television receiver, but cannot be made without disruption of presentation if a program is being presented for viewing (i.e., if the user is watching a program). As another example, a network connection could be ripe for disconnection only under certain circumstances, say when one or more receivers are not providing content for presentation, are not recording content, etc.

As yet another example, the television receiver may identify a contingent adjustment pertaining to recording content. Say, for example, a special feature of default recording of prime time content may be disabled (e.g., the recorder and/or tuner) unless the user has specifically selecting the prime time recording. In some cases, the television receiver may determine whether a scheduled recording may be rescheduled or canceled. Certain programs may have repeat showings. The television receiver may identify a given program scheduled for recording, and search for a previous recording of the program. Thus, in the case that the scheduled recording is for a repeat showing that has already been recorded, the television receiver may cancel the scheduled recording.

The television receiver could also be forward-looking and search for one or more future repeat showings of the program. Upon identification of a repeat showing, the television receiver may determine whether the next repeat showing is scheduled within an anticipated peak usage period. If so, the television receiver may automatically cancel the scheduled recording and schedule a recording of the repeat showing. If not, the television receiver may iteratively search for and check repeat showings to determine if any such viable alternatives exist. If no alternatives are found, the television receiver may either proceed with the scheduled recording or cancel the scheduled recording, depending on the power savings mode (e.g., with a relatively low power savings mode, the scheduled recording may be allowed to proceed; but, with a relatively high power savings mode, the scheduled recording may be canceled).

In some embodiments, the television receiver may make determinations of whether to temporarily cancel scheduled recordings based on user history. If previously recorded content corresponding to the scheduled recording specifically (e.g., previous corresponding episodes) have not been viewed, a scheduled recording may be canceled. Some embodiments could employ one or more thresholds to make the determination. An unviewed recording threshold could be used such that the scheduled recording may be canceled if the number of unviewed recordings meets or exceeds the unviewed recording threshold. Accordingly, the television receiver may infer that the recorded content is of lesser importance to the user. Additionally or alternatively, the television receiver could determine whether a pattern of the user is viewing the recording content. Say, for example, a series of recordings correspond to a series of episodes for a particular program, and the television receiver determines that the user is sequentially viewing the recording episodes. In such a scenario, the television receiver may infer that the user, and though perhaps "behind" in viewing recent episodes, is highly interested in the content. The television receiver may then determine that the scheduled recording should not be canceled. In some embodiments, this pattern determination could override a determination based on the unviewed recording threshold.

As indicated by block 414, in some embodiments, the television receiver may provide one or more notifications to users prior to an operational mode transition to inform the user of the change. Such notifications may be presented at the television receiver and/or via the coupled television display. A notification could be provided for all changes or for only select changes. In particular, a notification may be provided for changes that affect the user's viewing, recording, and/or navigation experience. No notification may be provided for certain changes that do not affect the user's experience, according to certain embodiments.

As indicated by block 416, the television receiver may be configured according to a second operating mode. The second operating mode may correspond to the initial, default, and/or normal operating mode such that the television receiver returns to the former state that it was in prior to entering one or more power savings modes. In some embodiments, the second operating mode may correspond to another power savings mode. Thus, the television receiver may transition from a first power savings mode to a second power savings mode. The second power savings mode could correspond to a user-selected/-defined power savings mode.

The second power savings mode could be selected by the television receiver based at least in part on dynamic adjust in view of a performance goal, or in view of a newly identified performance goal. The second power savings mode could be selected by the television receiver based at least in part on a gradated power savings scheme to address a fluctuation of customer usage. The fluctuation of customer usage could, for example, correspond to a build-up of attention to a series of events, say a series including preliminary events culminating in a main event. Customer usage associated with the preliminary events could be greater than a first set of one or more thresholds, and customer usage associated with the main event could be greater than a greater threshold.

As indicated by block 418, in some embodiments, the television receiver may process power usage information. In various embodiments, the television receiver may monitor, measure, detect, estimate, and/or otherwise gather information pertaining to power usage and/or savings. The power usage information may be retained by the television receiver, and, in certain embodiments, may be conveyed to the service provider. Any suitable power usage and/or savings metrics may be derived to indicate power usage and/or savings associated with any one or combination of operational modes of the television receiver. This may allow for the surfacing of savings information to an end user. A power usage history for the television receiver system, which may include one or more secondary television receivers, may thus be compiled for informing an end user and/or service provider. Power usage information may be processed for any suitable time period. For example, current usage or usage over a past time period may be determined and compared to a previous corresponding time period (e.g., the past month's usage may be compared to usage from a previous month, one year's usage may be compared to a previous year's usage, etc.). In some embodiments, the accounting of the usage may consider pricing information that may be estimated, assumed, and/or gathered from the user's electricity provider to provide indicia of cost savings. The user could provide input of pricing information in some implementations. In some cases, a service provider may gather pricing information from the user's electricity provider and/or electricity providers servicing the user's general locality. The pricing information could correspond to average or otherwise typical pricing for the user's general locality.

As indicated by block 420, in some embodiments, the television receiver may provide indicia of power usage and/or savings information for presentation to and/or access by an end user. The information could be presented along with an end-user configuration interface. The information may be presented at the television receiver and/or via the coupled television display. For example, on a monthly-basis a particular television receiver may output a user interface or display that lists power savings for the particular month (e.g., "You conserved 100 Watts in January"). Along with power savings, the particular television receiver may output a user interface or display that lists a dollar amount associated with power savings for the particular month (e.g., "You saved $20 in January").

In some embodiments, the television receiver could be configured to send a service provider report information concerning power savings. The report information could include confirmation of power savings compliance responsive to indication of peak usage time provided by the service provider to the television receiver.

The reporting features of some embodiments may allow a service provider to provide financial incentives/reward for customers taking part in a power savings program. For example, customers enrolling in a power savings program could receive a discount. As another example, customers pursuing additional power savings measures beyond peak time power savings could be incentivized with rewards from the service provider.

Figure 5:
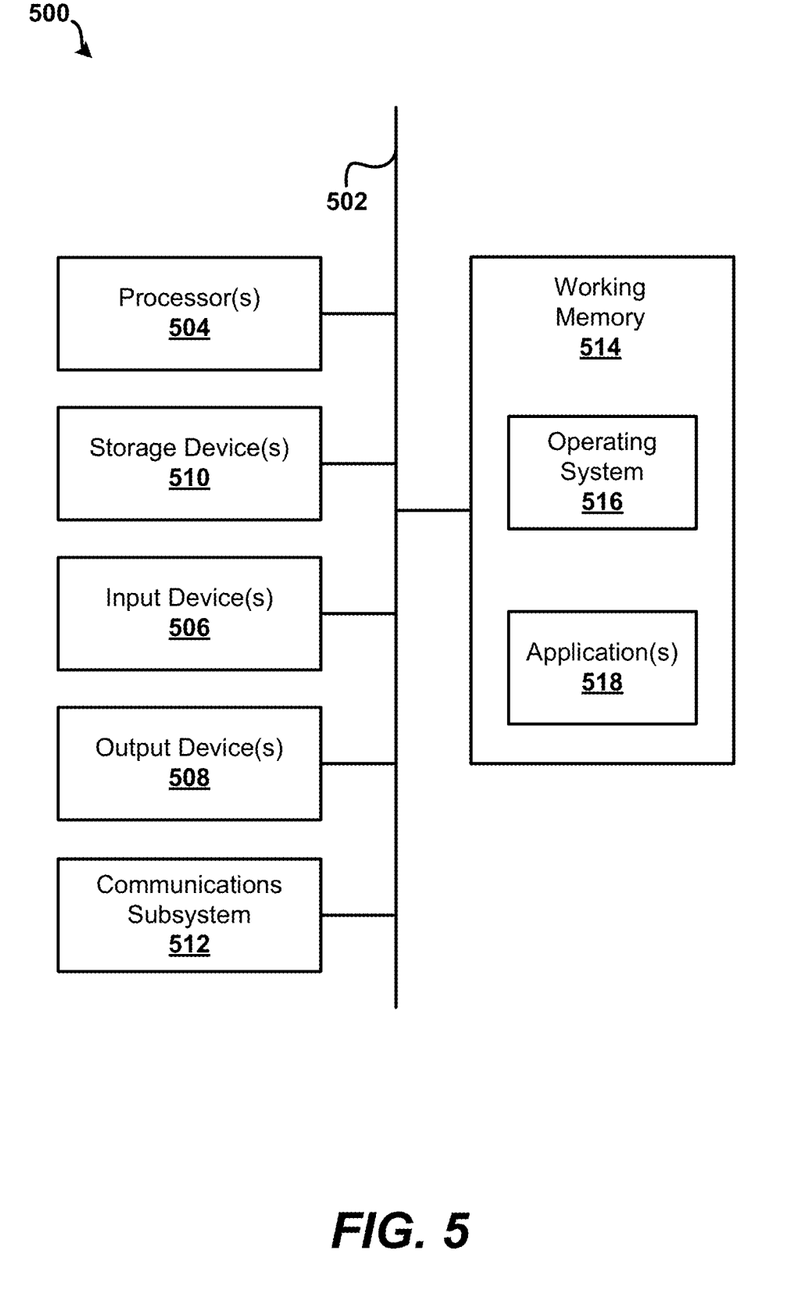
FIG. 5 shows an example computing system or device, in accordance with certain embodiments of the present disclosure.

FIG. 5 shows an embodiment of an example computer system or device 500 in accordance with the present disclosure. An example of a computer system or device includes an enterprise server, blade server, desktop computer, laptop computer, personal data assistant, smartphone, gaming console, set-top-box, and any other type of machine for performing calculations. The computer system 500 may be wholly or at least partially incorporated as part of previously-described computing devices, such as the PTR 110, the secondary television receivers 112*a-b*, the televisions 114*a-c*, and the computing devices 116*a-b* of FIG. 1. The example computer device 500 may be configured to perform and/or include instructions that, when executed, cause the computer system 500 to perform any one or combination of aspects the methods disclosed herein.

The computer device 500 is shown comprising hardware elements that may be electrically coupled via a bus 502 (or may otherwise be in communication, as appropriate). The hardware elements may include a processing unit with one or more processors 504, including without limitation one or more general-purpose processors and/or one or more special-purpose processors (such as digital signal processing chips, graphics acceleration processors, and/or the like); one or more input devices 506, which can include without limitation a remote control, a mouse, a keyboard, and/or the like; and one or more output devices 508, which can include without limitation a presentation device (e.g., television), a printer, and/or the like.

The computer system 500 may further include (and/or be in communication with) one or more non-transitory storage devices 510, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 500 might also include a communications subsystem 512, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 512 may permit data to be exchanged with a network (such as the network described below, to name one example), other computer systems, and/or any other devices described herein. In many embodiments, the computer system 500 will further comprise a working memory 514, which may include a random access memory and/or a read-only memory device, as described above.

The computer device 500 also can comprise software elements, shown as being currently located within the working memory 514, including an operating system 516, device drivers, executable libraries, and/or other code, such as one or more application programs 518, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 510 described above. In some cases, the storage medium might be incorporated within a computer system, such as computer system 500. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 500) to perform methods in accordance with various embodiments of the invention. According to a set of embodiments, some or all of the procedures of such methods are performed by the computer system 500 in response to processor 504 executing one or more sequences of one or more instructions (which might be incorporated into the operating system 516 and/or other code, such as an application program 518) contained in the working memory 514. Such instructions may be read into the working memory 514 from another computer-readable medium, such as one or more of the storage device(s) 510. Merely by way of example, execution of the sequences of instructions contained in the working memory 514 may cause the processor(s) 504 to perform one or more procedures of the methods described herein.

The terms "machine-readable medium" and "computer-readable medium," as used herein, may refer to any medium that participates in providing data that causes a machine to operate in a specific fashion. In an embodiment implemented using the computer device 500, various computer-readable media might be involved in providing instructions/code to processor(s) 504 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 510. Volatile media may include, without limitation, dynamic memory, such as the working memory 514.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 504 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 512 (and/or components thereof) generally will receive signals, and the bus 502 then might carry the signals (and/or the data, instructions, etc. carried by the signals) to the working memory 514, from which the processor(s) 504 retrieves and executes the instructions. The instructions received by the working memory 514 may optionally be stored on a non-transitory storage device 510 either before or after execution by the processor(s) 504.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enabling peak time power savings, the method comprising:
    processing, by a television receiver, an indication of a peak usage period, the indication received by the television receiver from a service provider via a network, wherein the peak usage period corresponds to television receiver usage of a plurality of television receivers in a media content distribution system;
    selecting, by the television receiver, a power savings mode from a plurality of operating modes based at least in part on the indication received by the television receiver from the service provider;
    processing, by the television receiver, configuration information related to the power savings mode;
    configuring, by the television receiver, the television receiver according to the configuration information related to the power savings mode at a first time corresponding to the peak usage period, wherein the television receiver operates in conformity with the power savings mode after the first time corresponding to the peak usage period; and
    configuring, by the television receiver, the television receiver according to a second operating mode of the plurality of operating modes at a second time corresponding to the peak usage period after the first time corresponding to the peak usage period, wherein the television receiver operates in conformity with the second operating mode after the second time corresponding to the peak usage period.

2. The method of claim 1, wherein the first time corresponding to the peak usage period is prior to the peak usage period.

3. The method of claim 1, wherein the second time corresponding to the peak usage period is after the peak usage period.

4. The method of claim 1, wherein the television receiver operates in conformity with the second operating mode prior to the first time corresponding to the peak usage period.

5. The method of claim 1, wherein the indication of the peak usage period is pushed to the television receiver by the service provider.

6. The method of claim 1, wherein the indication of the peak usage period is pulled by the television receiver from the service provider.

7. The method of claim 1, further comprising:
    determining, by the television receiver, the first time corresponding to the peak usage period based at least in part on the indication received by the television receiver from the service provider.

8. The method of claim 7, wherein the first time corresponding to the peak usage period is determined based at least in part on the indication received by the television receiver from the service provider and programming information.

9. The method of claim 1, further comprising:
    determining, by the television receiver, the first time corresponding to the peak usage period and the second time corresponding to the peak usage period based at least in part on the indication received by the television receiver from the service provider.

10. A television receiver that enables peak time power savings, the television receiver comprising:
    one or more processors; and
    a memory communicatively coupled with and readable by the one or more processors and having stored therein processor-readable instructions which, when executed by the one or more processors, cause the one or more processors to:
    process an indication of a peak usage period, the indication received by the television receiver from a service provider via a network, wherein the peak usage period corresponds to television receiver usage of a plurality of television receivers in a media content distribution system;
    select a power savings mode from a plurality of operating modes based at least in part on the indication received by the television receiver from the service provider;
    process configuration information related to the power savings mode;
    configure the television receiver according to the configuration information related to the power savings mode at a first time corresponding to the peak usage period, wherein the television receiver operates in conformity with the power savings mode after the first time corresponding to the peak usage period; and
    configure the television receiver according to a second operating mode of the plurality of operating modes at a second time corresponding to the peak usage period after the first time corresponding to the peak usage period, wherein the television receiver operates in conformity with the second operating mode after the second time corresponding to the peak usage period.

11. The television receiver of claim 10, wherein the first time corresponding to the peak usage period is prior to the peak usage period.

12. The television receiver of claim 10, wherein the second time corresponding to the peak usage period is after the peak usage period.

13. The television receiver of claim 10, wherein the television receiver operates in conformity with the second operating mode prior to the first time corresponding to the peak usage period.

14. The television receiver of claim 10, wherein the indication of the peak usage period is pushed to the television receiver by the service provider.

15. The television receiver of claim 10, wherein the processor-readable instructions further cause the one or more processors to:
  determine the first time corresponding to the peak usage period based at least in part on the indication received by the television receiver from the service provider.

16. The television receiver of claim 10, wherein the processor-readable instructions further cause the one or more processors to:
  determine the first time corresponding to the peak usage period and the second time corresponding to the peak usage period based at least in part on the indication received by the television receiver from the service provider.

17. A non-transitory processor-readable medium comprising processor-readable instructions which, when executed by one or more processors, cause the one or more processors to:
  process an indication of a peak usage period, the indication received by a television receiver from a service provider via a network, wherein the peak usage period corresponds to television receiver usage of a plurality of television receivers in a media content distribution system;
  select a power savings mode from a plurality of operating modes based at least in part on the indication received by the television receiver from the service provider;
  process configuration information related to the power savings mode;
  configure the television receiver according to the configuration information related to the power savings mode at a first time corresponding to the peak usage period, wherein the television receiver operates in conformity with the power savings mode after the first time corresponding to the peak usage period; and
  configure the television receiver according to a second operating mode of the plurality of operating modes at a second time corresponding to the peak usage period after the first time corresponding to the peak usage period, wherein the television receiver operates in conformity with the second operating mode after the second time corresponding to the peak usage period.

18. The non-transitory processor-readable medium of claim 17, wherein the first time corresponding to the peak usage period is prior to the peak usage period, and the second time corresponding to the peak usage period is after the peak usage period.

19. The non-transitory processor-readable medium of claim 17, the processor-readable instructions further causing the one or more processors to:
  determine the first time corresponding to the peak usage period based at least in part on the indication received by the television receiver from the service provider.

20. The non-transitory processor-readable medium of claim 17, the processor-readable instructions further causing the one or more processors to:
  determine the first time corresponding to the peak usage period and the second time corresponding to the peak usage period based at least in part on the indication received by the television receiver from the service provider.

* * * * *